United States Patent [19]
Yoshida

[11] Patent Number: 5,343,031
[45] Date of Patent: Aug. 30, 1994

[54] METHOD OF DECODING A TWO-DIMENSIONAL CODE SYMBOL MARK

[75] Inventor: Hirokazu Yoshida, Osaka, Japan

[73] Assignee: Teiryo Sangyo Co., Ltd., Osaka, Japan

[21] Appl. No.: 999,130

[22] Filed: Dec. 31, 1992

[30] Foreign Application Priority Data

Apr. 6, 1992 [JP] Japan ............... 4-114023

[51] Int. Cl.$^5$ ............................................. G06K 7/10
[52] U.S. Cl. ........................... 235/494; 235/454; 235/456
[58] Field of Search .................. 235/494, 454, 456

[56] References Cited

U.S. PATENT DOCUMENTS

| | | |
|---|---|---|
| 4,286,146 | 8/1981 | Uno et al. ............... 235/494 |
| 4,924,078 | 5/1990 | Sant'Anselmo ........... 235/494 |
| 4,939,354 | 7/1990 | Priddy .................... 235/494 |
| 5,053,609 | 10/1991 | Priddy et al. ............ 235/494 |
| 5,091,966 | 2/1992 | Bloomberg ............... 235/494 |
| 5,128,526 | 7/1992 | Yoshida ................... 235/494 |
| 5,168,147 | 12/1992 | Bloomberg ............... 235/494 |
| 5,170,044 | 12/1992 | Pastor ..................... 235/494 |
| 5,202,552 | 4/1993 | Little et al. ............... 235/494 |
| 5,223,701 | 7/1993 | Batterman ................ 235/494 |
| 5,245,165 | 9/1993 | Zhang ..................... 235/494 |

FOREIGN PATENT DOCUMENTS

| | | |
|---|---|---|
| 0437627 | 7/1990 | European Pat. Off. . |
| 64-76176 | 3/1989 | Japan . |
| 64-86289 | 3/1989 | Japan . |
| WO9102327 | 2/1991 | PCT Int'l Appl. . |

*Primary Examiner*—Harold Pitts

[57] ABSTRACT

A method for decoding and processing at high speed by reading two-dimensional code symbol marks by a code reader in a small memory capacity. The X-axis side indication line 4 or Y-axis side indication line 5 in an information area 8 recording the code symbol mark 2 is read by the code reader 3, and division marks 7 recorded on the X-axis side indication line 4 or Y-axis side indication line 5 are detected. At every interval of dividing the division marks 7 in the Y-axis direction or X-axis direction by a specific integer value, the code mark 9 of the binary signal recorded in the information are 8 is sequentially read by the code reader 3 up to an end part of the Y-axis side indication line 5 or the X-axis side indication line 4 and the region formed in each square, of which one side is the interval of the division mark 7 is read by the code reader 3, or the length between the division codes divided by an integer value is processed, thereby decoding the code symbol mark 2.

13 Claims, 5 Drawing Sheets

METHOD OF DECODING A TWO-DIMENSIONAL CODE SYMBOL MARK

TECHNICAL FIELD

The present invention relates to a method of decoding a two-dimensional code symbol mark in an information processing field such as sales and production control.

BACKGROUND ART

Presently, a method of displaying a bar code with black and white bars in various densities, and reading with an optical code reader such as bar code reader or a laser, is widely used in the distribution industry, production control, and other fields.

The bar code has limited information transmission capacity because only black and white bars are displayed at narrow or wide intervals in a one-dimensional direction. For example, Chinese characters, Japanese hiragana, and Arabic letters cannot be expressed.

Accordingly, the present inventor previously proposed two-dimensional code symbol marks in a matrix, and the apparatus and method of reading them in the Japanese Laid-Open Patent No. Sho. 64-86289, Japanese Laid-Open Patent No. Sho. 64-76176, and PCT/JP90/00980.

The two-dimensional symbol mark is effective because an extremely large amount of information can be displayed and transmitted, and this two-dimensional code symbol mark may be read by an image reader and the image is processed.

Since the code symbol is read in very fine intervals, for example, 0.1 mm by the image reader and processed by an analog process, the quantity of data to be read is very large and the memory capacity required is larger, it takes time to read, and also decoding of the code symbol mark is time-consuming.

SUMMARY OF THE INVENTION

It is hence a primary object of the present invention to read a two-dimensional code symbol mark with a small memory capacity, and decode at high speed.

It is another object of the present invention to decode a two-dimensional symbol mark easily and promptly by reading the X-axis side indication line and Y-axis side indication line for specifying the information area of the two-dimensional code symbol mark, and division marks provided on the X- and Y-axis side indication lines with a code reader to detect the X-axis side or Y-axis side, or the X-axis side and Y-axis side.

It is another object of the present invention to decode and process by scanning, the code reader at rough reading precision in spite of two-dimensional code symbol mark, thereby detecting the code symbol mark promptly.

It is another object of the present invention to decode and process, with a line sensor or laser scanner of one-dimensional charge coupled device (CCD) in spite of two-dimensional code symbol mark.

It is a further different object of the invention to decode the code symbol mark promptly and accurately if the code symbol mark is distorted due to facsimile transmission, elongation, or contraction of code paper, or see-through.

It is another object of the present invention to decode easily and promptly reading the code mark within the information area specified by the X-axis side indication line and Y-axis side indication line of the two-dimensional code symbol mark.

Other objects and advantages of the invention will be better under stood and appreciated from reading of the following description.

The invention presents, in order to solve the above problems in the light of the background described herein, a method of decoding a two-dimensional code symbol mark by specifying an information area using an X-axis side indication line of the X-axis side and a Y-axis side indication line of the Y-axis side for determining the reading range of the two-dimensional code symbol mark, and reading the code mark of binary signal recorded in this information area, thereby decoding the code symbol mark, wherein the x-axis side indication line and/or the Y-axis side indication line of the information area recording the code symbol mark, and the division marks recorded on such X-axis side indication line and/or the Y-axis side indication line are first detected by the code reader, then the code marks of binary signals recorded in the information area are sequentially read by the code reader to an end part of the Y-axis side indication line and/or X-axis side indication line at every interval of dividing the detected division mark by a specified integer value, and the code symbol mark recorded in the information area is decoded by decoding and processing the code mark recorded in each region formed in a square, of which one side is the length of dividing the interval of the division marks read by the code reader or the division mark spacing by an integer value.

According to the invention, by detecting the X-axis side indication line, Y-axis side indication line, and their division marks by the code reader, in a range specified by the X-axis side indication line and Y-axis line indication line by recording the two-dimensional code symbol mark may be easily located, so that decoding and processing may be executed.

Furthermore, by sequentially reading the recorded code mark at every interval specified by the division marks, the code marks recorded in the two-dimensional information area can be processed digitally, and can be read and processed by the code reader like the bar code, and therefore the memory capacity may be significantly decreased, and the decoding speed increased.

Moreover, by calculating the region of small division formed in a square of which one side is the length of dividing the interval of division marks or the division mark spacing by an integer value, and processing the information in every region of small division of the read code marks to decode the code symbol marks recorded in the information area, even the two-dimensional code symbol mark may be digitally processed, without an image processing by image reader as required in the prior art, so as to be decoded and processed promptly.

The present invention will become more fully understood from the detailed description given hereinbelow and the accompanying drawings which are given by way of illustration only, and thus are not limitative of the present invention.

DESCRIPTION OF THE PREFERRED EMBODIMENTS

Figure 1:
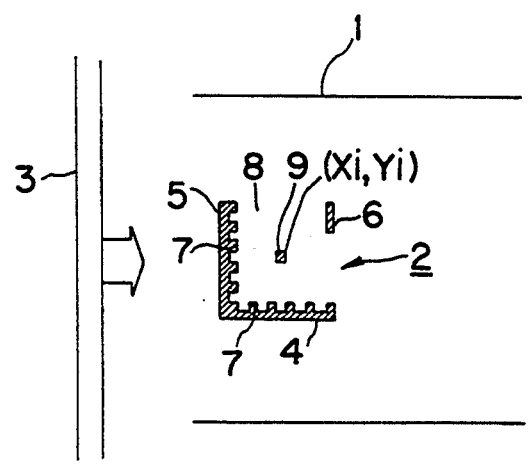
FIG. 1 is a diagram illustrating reading the code symbol mark by a code reader according to a first embodiment of the present invention.

Referring now to the drawings, some of the preferred embodiments of the invention are described in detail below. FIGS. 1 to 5 relates to an embodiment of the invention. In a data sheet 1 of specified dimensions, a matrix two-dimensional code symbol mark 2 is recorded as shown in FIG. 1, and this code symbol mark 2 is read by a code reader 3 of a CCD sensor of image pickup device for one-dimensional use.

Figure 2:
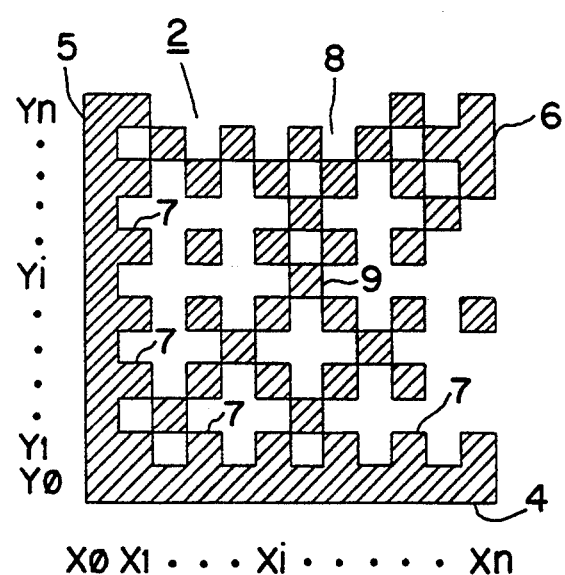
FIG. 2 is a magnified view of a code symbol mark.

The code symbol mark 2 comprises, as shown in FIGS. 1 and 2, an X-axis side indication line 4 for determining the X-axis side, a Y-axis side indication line 5 for determining the Y-axis side, and a corner mark 6 of an asymmetrical shape at a diagonal position of their intersection, and division marks 7 are provided on the X-axis side indication line 4 and Y-axis aside indication line 5 so as to divide these lines into a plurality of segments.

The division marks 7, as shown in FIGS. 1 and 2, segment the X-axis side indication line 4 and Y-axis side indication line 5 at specific intervals, and also the width and length of the division marks 7 are set equal to the above interval so as to record the code symbol mark 2 at the highest possible density.

In this way, by properly recording code marks 9 of a binary symbol at proper positions (Xi, Yi) (only one position is shown in FIG. 1 for ease of understanding) in the information area 8 enclosed by the X-axis side indication line 4, Y-axis side indication line 5 and corner mark 6, the specified code symbol mark 2 is expressed.

For example, in the region enclosed by four or five division marks 7 corresponding to intersection side of the X-axis side indication line 4 and Y-axis side indication line 5 of the information area 8, principal information such as production information, accounting information, and management information is recorded, and on an opposite side, auxiliary information, such as nation information and cipher information is recorded, so that a large quantity of information may be expressed and transmitted.

Figure 3:
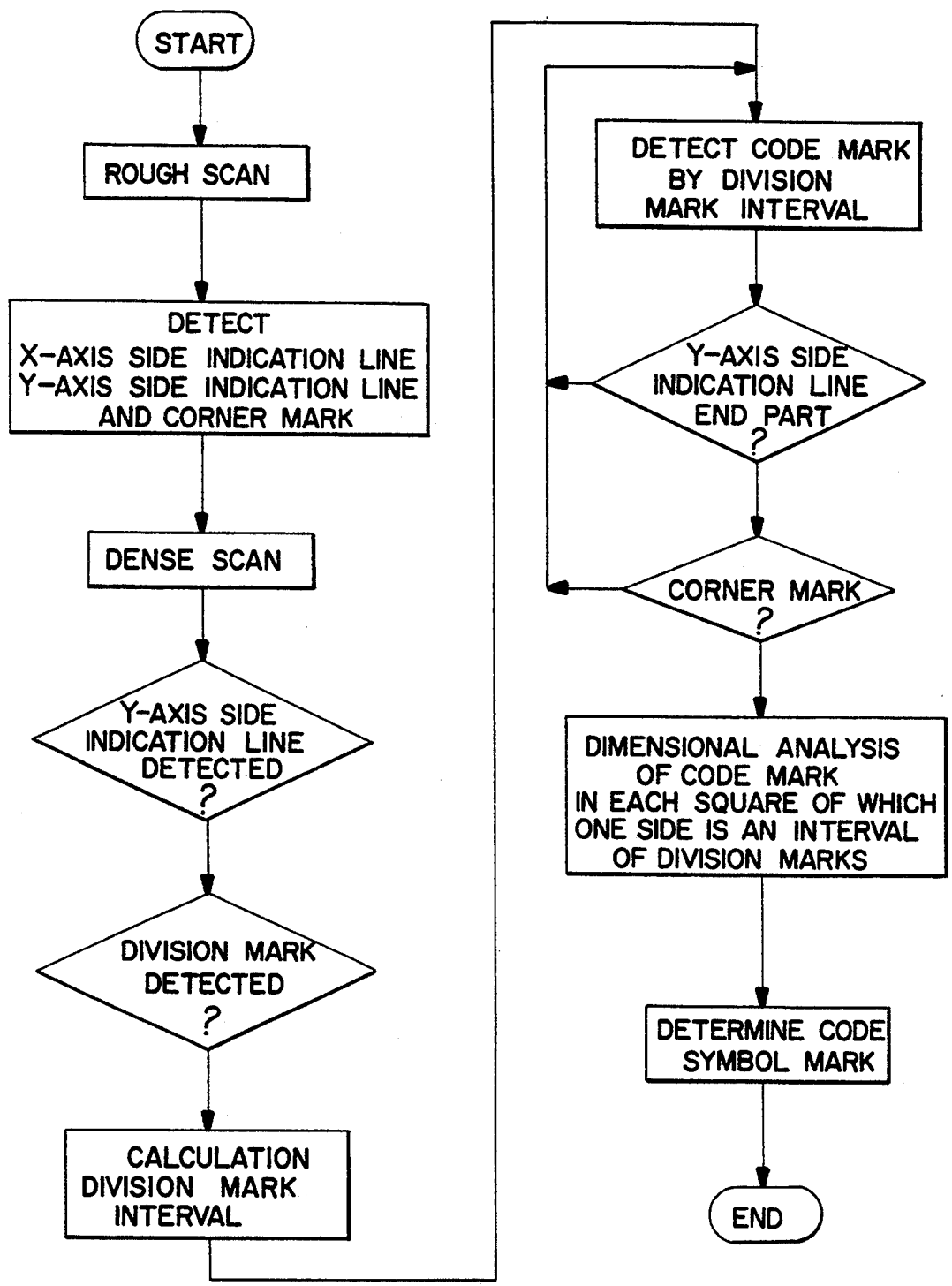
FIG. 3 is a flow chart for explaining reading and decoding process of the code symbol mark.
Figure 4:
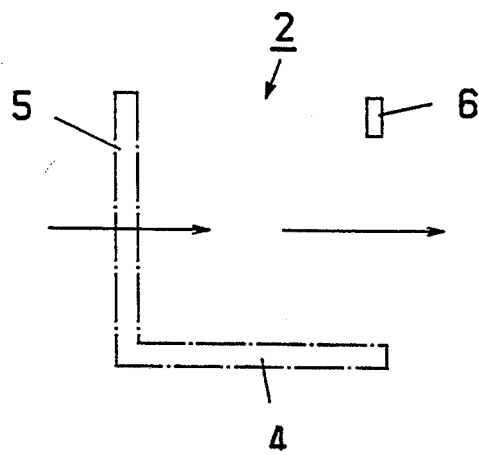
FIGS. 4A, 4B and 4C are diagrams illustrating reading the code symbol mark.
Figure 4:
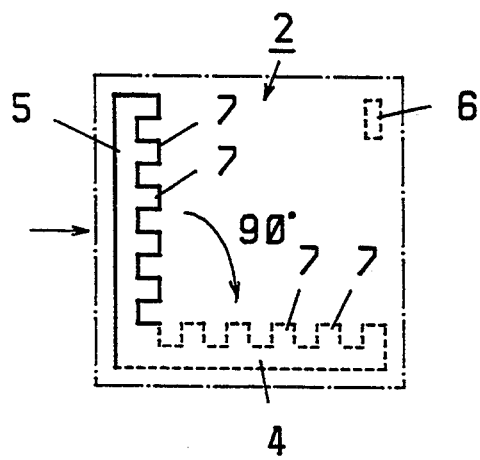
Figure 4:
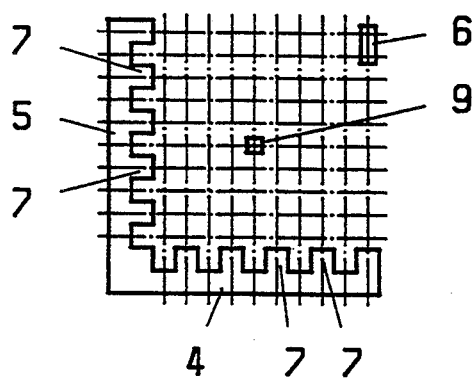
Figure 5:
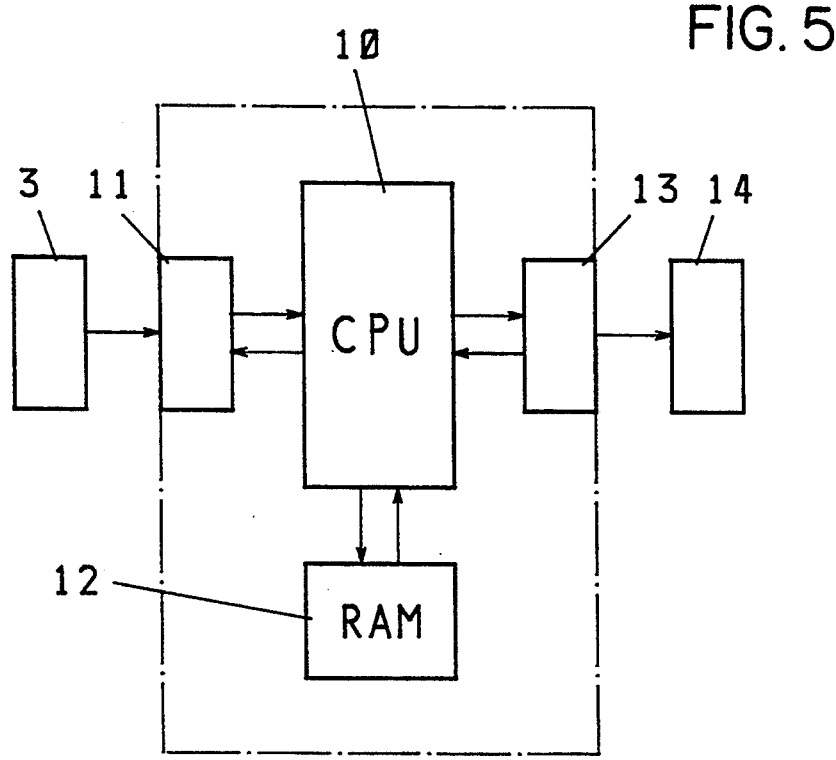
FIG. 5 is a diagram illustrating a computer implementation of the present invention.

In the method of reading the code symbol mark 2 by a code reader 3 of a one-dimensional CCD sensor, for example as shown in FIGS. 3 and 4(A), first the code reader 3 is moved at rough reading precision in the direction of the X-axis at every 3 to 10 mm, or preferably 5 to 10 mm to detect the Y-axis side indication line 5, X-axis side indication line 4, and corner mark 6, and the positions of the Y-axis side indication line 5, X-axis side indication line 4 and corner mark 6 are entered in a microcomputer 10 through an input interface 11 as shown in FIG. 5. The Y-axis side indication line 5 and X-axis side indication line 4 may be detected by sensing a continuous bar of a specific length. Thus, since the code reader 3 is moved roughly, the position of the code symbol mark 2 and the information region may be detected in a short time.

From a region slightly larger than the information area 8 of the code symbol mark 2 detected above, the Y-axis side indication line 5, the position and width of the difvision marks 7, the number of division marks 7 and their interval are detected in relation with the relative length with the Y-axis side indication line 5 as shown in FIGS. 3 and 4(B) by a precise reading pitch of 0.1 to 0.5 mm (the pitch to be read, corresponding to the size of the code symbol mark) again by the code reader 3 as shown in FIG. 4(B), and are fed into the microcomputer 10. The division marks 7 are recognized by detecting a continuous array at specific intervals on the Y-axis side indication line 5. Meanwhile, the interval of division marks 7, assumed to be equal, may be calculated from the length of the Y-axis side indication line 5 and number and width of the division marks 7.

In the code symbol mark 2, as shown in FIGS. 1 and 2, from the X-axis side indication line 4 and Y-axis side indication line 5, the code reader 3 may be scanned from either the X-axis side or the Y-axis side so as to read the code symbol mark, and by the presence or absence of division marks 7, the code symbol mark 2 may be promptly distinguished, so as to decide whether or not to decode easily.

In this way, when the division marks 7 at the Y-axis side indication line 5 side are detected, on the basis of this Y-axis detection, as shown in FIG. 4(B), the detected data is rotated 90 degrees, and the position of the division marks 7 of the X-axis side indication line 4 side is calculated.

After decoding, at every interval of the division marks 7 calculated in the X-axis direction according to FIG. 3, the corner mark 9 at the position recorded in the information area 8 (Xi, Yi) as shown in FIG. 4(C) is sequentially read by the code reader 3, and is fed into a memory unit 12 of the RAM of the microcomputer 10. When the end of the X-axis side indication line 4 or the end of the corner mark 6 is reached, when passing over the predetermined range, reading is terminated.

Since the code mark 9 is read at every interval of the division marks 7 in this way, digital, not analog, reading is processed the same as in bar code. It is preferred to read at a middle point of the center of gravity of the division marks 7 and every middle point between the division marks 7 as shown in FIG. 4(C) in order to prevent errors.

When reading by the code reader 3 is terminated, according to the direction of the asymmetric corner mark 6, the code mark 9 in the region (Xi, Yi) of a small division formed in a square of which one side is the interval of the division marks 7 from the detected division mark 7 side is analyzed by programmed dimensional analytical process or other method, and the code symbol mark 2 recorded in the information area 8 specified by the X-axis side indication line 4 and Y-axis side indication line 5 is decoded, and as required it is provided to an external display means 14 such as printer through an output interface 13 as shown in FIG. 5.

Since the corner mark is slightly thinner and asymmetric as shown in FIGS. 1 and 2, even if the X-axis side indication line and Y-axis side indication line, or their division marks are symmetrical, the code symbol mark recorded in the information area may be decoded accurately. Furthermore, by detecting the corner mark, the code symbol mark may be accurately decoded even if the information area is detected in a rhombic shape by scanning the code symbol by seeing through with the code reader. Therefore, even in the two-dimensional code symbol mark, it can be decoded and processed one-dimensionally and digitally on the basis of the division marks, and analog image processing as in the conventional two-dimensional image processing is not required, and therefore the memory capacity is extremely small, so that it is possible to read at high speed and decode at high speed.

SECOND EMBODIMENT

Figure 6:
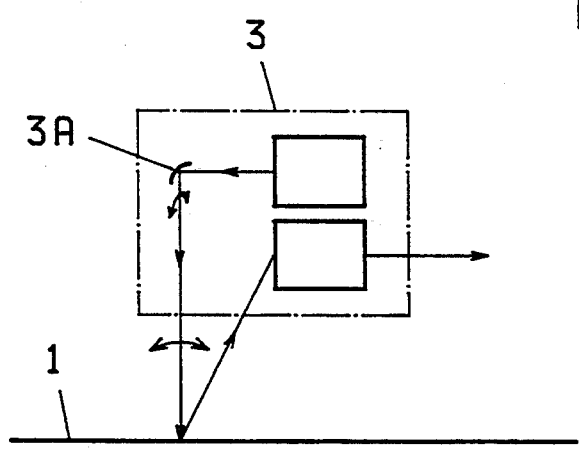
FIG. 6 is an input explanatory diagram by a scanner in other embodiment of the same.
Figure 7:
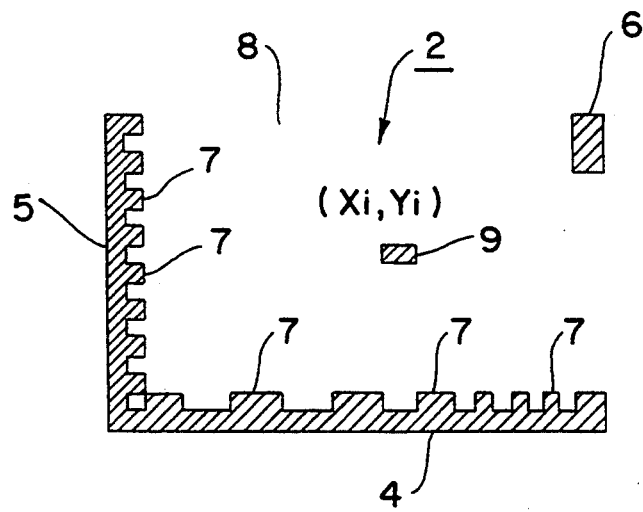
FIG. 7 is a diagram illustrating reading the code symbol mark.

In a second embodiment, as shown in FIG. 6, the code symbol mark 2 is read by the code reader 3 of one-dimensional laser scanner for detecting the reflected light of laser beam by the photo detector by revolving and oscillating a polygon mirror 3A.

In this embodiment, the laser beam is scanned by oscillating the polygon mirror 3A in the Y-axis direction as shown in the diagram, and the Y-axis side indication line 5 and division marks 7 are detected, and also by oscillating and scanning in the X-axis direction (if necessary, possible to scan in both Y-axis direction and X-axis direction), the X-axis side indication line 4 and its division marks 7 are detected, and the division marks 7 and the code mark 9 recorded in specified position (Xi, Yi) of the information area 8 in every interval of division marks 7 are sequentially read in the same manner as above.

In this embodiment, by detecting the individual division marks of the X-axis side indication line and small division in a square of which one side is the interval of division marks may be securely and accurately determined, and decoding errors may be prevented.

Also, this embodiment, if the code symbol mark 2 is elongated or contracted due to facsimile transmission or the like, by detecting the division marks 7, the information region may be accurately detected, and decoded.

THIRD EMBODIMENT

Figure 8:
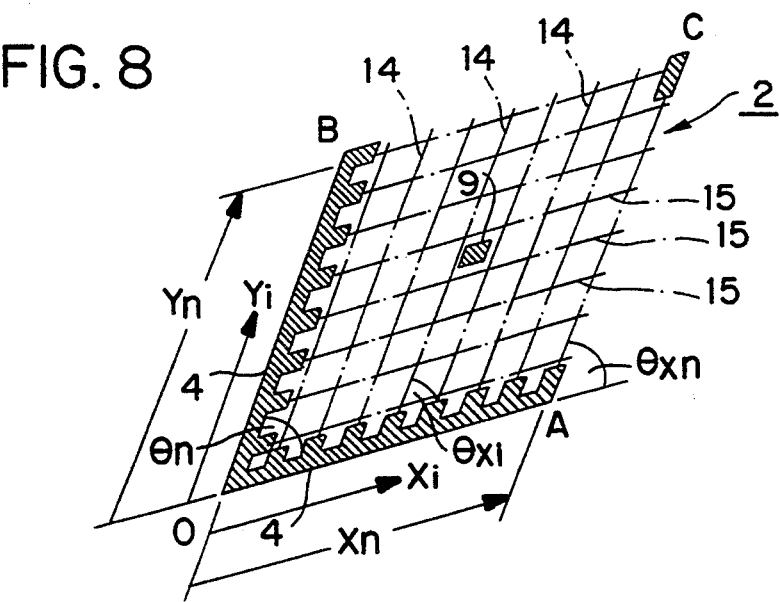
FIG. 8 is a diagram illustrating reading the code symbol mark in a second embodiment.

FIG. 8 shows a third embodiment of the invention. This embodiment relates to a decoding method of code symbol mark 2 corresponding to a case in which the information area 8 formed by the X-axis side indication line 4 and Y-axis side indication line 5 is deformed vertically and laterally (slightly exaggerated in the diagram).

In this embodiment the code symbol mark 2 is read by the code reader 3 and is fed into the microcomputer 10, while the start point O and end point B of the Y-axis side indication line 5, and the start point O and end point A of the X-axis side indication line 4, and also the end point C of the corner mark 6 are detected.

The Y-axis side indication line (4, O-B) corresponding to the X-axis side indicatin line (4, O-A), the crossing angles $\theta o$, $\theta xn$ of the A-C line, and the crossing angle $\theta yn$ of the B-C line to the Y-axis side indication line (4, O-B) are calculated by the microcomputer 10 as follows:

$$\theta xi = \theta o + i \times \frac{\theta xn - \theta o}{Nx} \quad (1)$$

$$\theta yi = \theta o + i \times \frac{\theta yn - \theta o}{NY} \quad (2)$$

where Nx is the number of division marks on the X-axis side indication line 4 for linear interpolation, and Ny is the number of division marks on the Y-axis side indication line 5 for linear interpolation.

By calculating the slant angle in the linear interpolation method of equations (1), (2), the Y-axis side division line 14, and X-axis side division line 15 starting from the i-th division mark 7 on the X-axis side indication line 4 and the i-th division mark 7 on the Y-axis side indication line 5 can be individually calculated.

By processing the recorded information of the code mark 9 in each region of small divisions of squares formed by these intersections, sequence the code symbol mark 2 of the information area 8 is decoded and processed.

In the third embodiment, if the information area 8 specified by the X-axis side indication line and Y-axis side indication line is deformed in a rhombic shape or the like by facsimile transmission, paper elongation, or contraction, see-through reading or the like, the region of each small division of information area may be accurately restored, and the code mark can be detected, and the two-dimensional code symbol mark may be decoded and processed.

Also in the third embodiment, using the linear interpolation method according to the above principle, the division line calculating the slant angle passing through each end part of division mark is deduced, and recording of the code mark in the region enclosed by the crossing points of these division lines may be the processed same as in the foregoing embodiments.

For the ease of understanding, in the reading method disclosed herein only one code symbol mark is illustrated, but it is obvious that a plurality or a multiplicity may be similarly read and processed.

Further, in the above embodiments, for the sake of simplicity, the code mark is detected at every interval of the division marks (the interval of division marks divided by an integer value of 1), but even in the case of code symbol mark recording the code marks by dividing the interval of division marks into a plurality by an integer value of 2 or 4, the code mark at position (Xij, Ykl) may be similarly decoded and processed by programmed dimensional processing method, by reading and processing at every interval of the division marks into a plurality by the integer value by means of the code reader.

In the above embodiments, the division marks are as wide as the interval of division marks so as to record the code marks as densely as possible, but if the division marks are narrow, the intermediate point of the division mark may be regarded as the interval of the division marks, so that it is possible to decode and process the two-dimensional code symbol mark according to the spirit of the invention.

In the foregoing embodiments, the information region of small divisions of the code symbol mark is calculated within the square enclosed by intersection of division lines according to the division marks of the X-axis side indication line and Y-axis side indication line, but it is also possible to calculate within the square of a specified range of which the center is each intersection of division lines one side is the length of the interval of division marks or dividing this interval by an integer value.

The above embodiments relate to optical detecting methods, but it is also possible to decode and process by writing the two-dimensional code symbol mark by using a magnetic material, and reading by a code reader making use of the magnetic head of a floppy disk drive of a computer, and hence it may be applied in IC card, telephone card and other media.

Incidentally, instead of the one-dimensional code reader explained herein, a two-dimensional code reader may be similarly applied to decode and process the code symbol mark.

Thus, in the invention, the two-dimensional code symbol mark may be decoded and processed by easily reading the code marks in the information area according to the division marks of the X-axis side indication line and Y-axis side indication line by means of the code reader, and therefore the recording capacity may be decreased, and it is possible to process at high speed.

What is claimed is:

1. A method of decoding a two-dimensional code symbol mark an information area defined by an X-axis side indication line and a Y-axis side indication line for determining a reading range of the two-dimensional code symbol mark and reading a binary signal of the code symbol mark recorded in the information area, thereby decoding the code symbol mark, wherein the X-axis side indication line or the Y-axis side indication line of the information area, and the division marks recorded on the X-axis side indication line or the Y-axis side indication line are detected by a code reader said method comprising the steps of:

(a) calculating intervals of the divisional marks at every point of the intervals dividing the detection marks up to an end part of the Y-axis side indication line or X-axis side indication line, by dividing a distance between them by a specified integer,
    (b) reading and digitally storing the binary signals of the code symbol mark, and
    (c) digitally decoding and processing the digitally stored code symbol mark recorded in each region formed in a square of which one side is a length defined by the intervals of the division marks or a division mark spacing divided by an integer value.

2. The method of decoding the two-dimensional symbol mark of claim 1, wherein the X-axis side indication line, the Y-axis side indication line the division marks recorded on the X-axis side indication line, and Y-axis side indication line, and corner marks at diagonal positions of intersections with the X-axis side indication line and Y-axis side indication line of which the code symbol mark is recorded in the information area are individually detected by the code reader, wherein crossing angles are calculated based on a detection of the X-axis side indication line and Y-axis side indication line, including calculating crossing angles of the X-axis side indication line with a straight line linking an end part of the X-axis side indication line and the corner mark, and calculating crossing angles of the Y-axis side indication line with a straight line linking an end part of the Y-axis side indication line and the corner mark and,
    calculating straight lines passing through the division marks of the X-axis side indication line and the Y-axis side indication line, or the points of segmenting the interval of the division marks into a specific number by linear interpolation method, and
    calculating region of each square formed by crossing of these straight lines, and
    digitally decoding the digitally stored code symbol mark recorded in the information area.

3. The method of decoding the two-dimensional code symbol mark of claim 1 or 2, wherein the code reader is first scanned at rough reading precision to detect the X-axis side indication line, the Y-axis side indication line, and the corner marks at the diagonal positions of the intersections with the X-axis side indication line and Y-axis side indication line of the information area recording the code symbol mark, and the code reader is scanned at dense reading precision to detect the X-axis side indication line and division marks on the X-axis side indication line, the interval of division marks or the Y-axis side indication line and division marks on the Y-axis side indication line, and an interval of division marks, thereby digitally decoding the digitally stored code symbol mark recorded in the information area specified by the X-axis side indication line and Y-axis side indication line.

4. The method of decoding the two-dimensional code symbol mark of any one of the claims 1 or 2, wherein the code reader is a line sensor or laser scanner of a one-dimensional charged coupled device (CCD).

5. The method of decoding the two-dimensional code symbol mark of claim 1 or 2, wherein digitally reading and storing the binary signals in the information region by the code reader is done at every point of an interval of a middle point of division mark, or at every point of an interval of a middle point between division marks.

6. A decoding method of two-dimensional code symbol mark of claim 1 or 2, wherein the code reader of a one-dimensional laser scanner is scanned and any one of the X-axis side indication line, the division mark on the X-axis side indication line, the Y-axis side indication line, and the division mark of the Y-axis side indication line of the information area recording the code symbol mark are detected by a detecting portion of a polygon mirror of the code reader, and the polygon mirror of the code reader of the laser scanner is revolved by 90 degrees, an indication line of a remaining side of the information area and the division marks are detected by other one-dimensional laser scanners installed in an orthogonal direction thereof, and the code symbol mark recorded in the information area specified by the X-axis side indication line and Y-axis side indication line is decoded.

7. The method of decoding the two-dimensional code symbol mark of claim 1 or 2, wherein two one-dimensional scanners are utilized orthogonal to each other, one of the one-dimensional scanners is scanned and any one of the X-axis side indication line, the division marks on the X-axis side indication line, the Y-axis side indication line, and the division marks on the Y-axis side indication line of the information area recording the code symbol mark are detected, and the other one-dimensional scanner is scanned and the indication line of the remaining side of the information area and its division marks are detected, and the code symbol mark recorded in the information area specified by the X-axis side indication line and Y-axis side indication line is digitally decoded.

8. The method of decoding the two-dimensional code symbol mark of claim 4, wherein each square of which one side is the interval of division marks determines the region of the specified range centered around the middle point of division mark or an extended point from the middle point between division marks, in order to digitally process the code mark recorded in the region.

9. The method of decoding the two-dimensional code symbol mark of claim 1 or 2, wherein each square of which one side is the interval of division mark is the region having the point extended from each end part side of division marks as a corner part, and the code mark recorded in this region is processed.

10. The method of decoding the two-dimensional code symbol mark of claim 1 or 2, wherein the information area is detected by reading the X-axis side indication line, Y-axis side indication line, and an asymmetrical corner mark at the diagonal position of their intersection.

11. The method of decoding the two dimensional code symbol mark of claim 1 or 2, wherein the division mark is as wide as the interval between division marks, and the interval of the division marks is set to a length of the interval between division marks.

12. The method of decoding the two-dimensional code symbol mark of claim 1 or 2, wherein the code symbol marks is written on a magnetic material.

13. The method of decoding the two-dimensional code symbol mark of claim 5, wherein each square of which one side is the interval of division marks determines the region of he specified range centered around the middle point of division mark or an extended point from the middle point between division marks, in order to digitally process the code mark recorded in the region.

* * * * *